J. A. SHEPHARD.
Improvement in Harvesters.
No. 131,307. Patented Sep. 10, 1872.
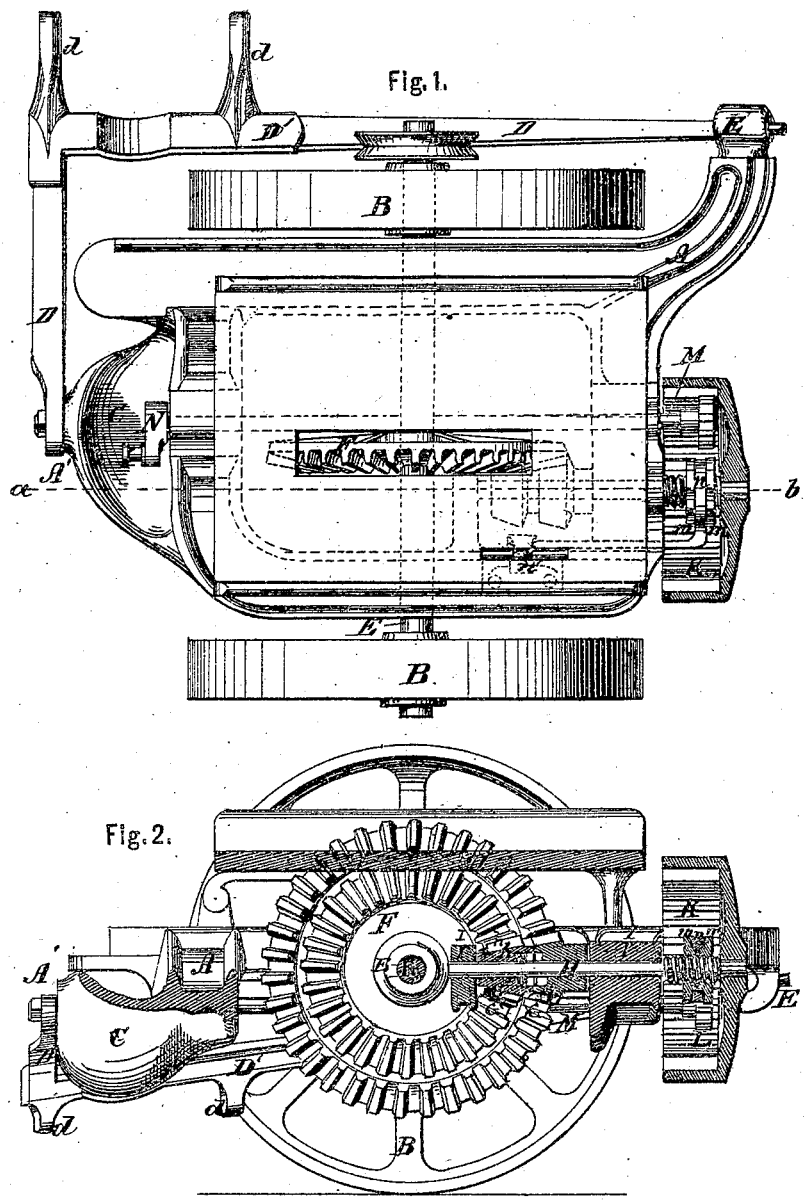
WITNESSES.
Jas. L. Ewin.
Walter Allen.
INVENTOR.
Joseph A. Shephard
By Knight Bros
Atty.

UNITED STATES PATENT OFFICE.

JOSEPH A. SHEPHARD, OF PORTSMOUTH, OHIO.

IMPROVEMENT IN HARVESTERS.

Specification forming part of Letters Patent No. 131,307, dated September 10, 1872.

Specification describing an Improvement in Harvesters, invented by JOSEPH A. SHEPHARD, of Portsmouth, in the county of Scioto, Ohio.

The invention consists in a mode of adjusting longitudinally the intermediate shaft carrying the clutch-pin, which engages, optionally, the faster or the slower gear-pinion.

Figure 1 is a top view of the improved machine, partly in section, and with pole, cutter-bar, and other parts omitted. Fig. 2 is a vertical longitudinal section on the line $a\,b$, Fig. 1.

A is the main carriage of the harvester, and B B the drive-wheels. At the forward point A', just in front of the shield C in which the crank of the pitman works, is journaled one end of an L-shaped stay-bar, D, its other extremity being journaled to a swiveled stud, E, on the rear right-hand corner of the carriage-frame A, which is here extended outwardly for this purpose. To the angle of this stay-bar D a cast bracket, D', is attached, which affords points of attachment $d\,d$ for the finger-bar, (not shown in the drawing.) The stay-bar proper is made in one piece throughout its length, and the cast bracket D' is bolted thereto. On the main axle E of the machine is keyed fast the wheel F, having two circles of bevel-gearing meshing, respectively, with the bevel-pinions G G', which rotate constantly in connection with the bevel-wheels when the machine is proceeding. H is a shaft journaled in bearings I I. Near its inner end are sleeved the two bevel-pinions G G', either of which is engaged by the pin $h$ on the shaft H as the latter is shifted longitudinally by the shifter-arm $n$ worked by the usual hand-lever $n'$. The shaft H has upon its outer end, which is at the rear part of the machine, an internal cog-wheel, K, (shown in section in Fig. 1,) which moves with the shaft both in its rotation and longitudinal shifting, the length of the cogs in the wheel K being such as to engage in either case with those of the pinion L on the shaft M, to whose front end the crank N of the pitman (not shown) is attached. On the shaft H, within the hollow of the wheel K, is a screw-threaded portion on which are two collars, $m\,m$, with a thickness of packing between them. The collars are of such form as unitedly to afford a circumferential groove occupied by the ring $n$ of the shifter. As this ring does not rotate, the mutual wear of itself and the collars occasions a lost motion which is taken up by screwing the collars $m\,m$ toward each other, without impairing the exact relations of the shaft H and its pin $h$ to the pinions G G', and to the central or inoperative space between the said pinions. The shifting-rod is secured to the ring $n$, and, by the shift, the wheel K, its pinion L, the shaft M, and eventually the knife-bar, are subjected to a greater or less relative speed, according to whether the connection be with the larger gear of wheel F or the smaller.

What I claim as new herein is the following:

In combination with the two speed-gears on wheel F and a longitudinally-shiftable shaft, H, I claim a compensation-clutch, substantially as described, for taking up the "lost motion" incident to wear.

JOSEPH A. SHEPHARD.

Witnesses:
W. B. GRICE,
E. D. RICKER.